United States Patent
Boss et al.

(10) Patent No.: US 9,292,891 B2
(45) Date of Patent: Mar. 22, 2016

(54) RECOVERY OF TIME DUE TO AN UNPLANNED EVENT ON A RESERVED ROUTE

(71) Applicant: International Business Machines Corporation, Armonk, NY (US)

(72) Inventors: Gregory Jensen Boss, Saginaw, MI (US); Andrew R. Jones, Round Rock, TX (US); Charles Steven Lingafelt, Durham, NC (US); Kevin C. McConnell, Austin, TX (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/313,269

(22) Filed: Jun. 24, 2014

(65) Prior Publication Data

US 2015/0371352 A1    Dec. 24, 2015

(51) Int. Cl.
*G06Q 50/30* (2012.01)
*G06Q 10/02* (2012.01)

(52) U.S. Cl.
CPC ............... *G06Q 50/30* (2013.01); *G06Q 10/02* (2013.01)

(58) Field of Classification Search
CPC .............................. G06Q 50/30; G06Q 10/02
USPC ......................................................... 701/117
See application file for complete search history.

(56) References Cited

U.S. PATENT DOCUMENTS

| | | | |
|---|---|---|---|
| 1,111,298 A * | 9/1914 | Crowley | .......................... 283/23 |
| 6,510,383 B1 | 1/2003 | Jones | |
| 6,526,392 B1 | 2/2003 | Dietrich | |
| 7,689,348 B2 | 3/2010 | Boss | |
| 7,778,769 B2 | 8/2010 | Boss | |
| 8,126,641 B2 | 2/2012 | Horvitz | |
| 2004/0260470 A1 | 12/2004 | Rast | |
| 2008/0215237 A1 | 9/2008 | Perry | |
| 2010/0106402 A1 | 4/2010 | Liu | |
| 2011/0166958 A1 * | 7/2011 | Hamilton et al. | .......... 705/26.25 |
| 2011/0208646 A1 | 8/2011 | McMaster | |

(Continued)

OTHER PUBLICATIONS

IBM—"Congestion pricing cuts Stockholm traffic by almost a fifth." Jun. 1, 2008. http://www.ibm.com/news/us/en/2008/06/11/m923159k70006p69.html.

(Continued)

*Primary Examiner* — Fadey Jabr
*Assistant Examiner* — Yazan A Soofi
(74) *Attorney, Agent, or Firm* — Brown & Michaels, PC; John R. Pivnichny

(57) ABSTRACT

Providing reserved routes for a plurality of vehicles, in which the at least a location is monitored and communicated from each of a plurality of vehicles having GPS devices and traveling to destinations on reserved routes with guaranteed arrival times. For a traffic event along one of the reserved routes; determining if any of the plurality of vehicles are affected or will be affected by the traffic event and calculating alternate routes for those vehicles The alternate routes are sent to the GPS devices in the affected or possibly affected vehicles and once the vehicle has reached the destination, comparing an actual arrival time of the vehicle at the destination to the guaranteed arrival time, and if the actual arrival time is later than the guaranteed arrival time, crediting a user of the vehicle for at least a portion of an amount paid for reserving the reserved route.

20 Claims, 6 Drawing Sheets

(56) References Cited

U.S. PATENT DOCUMENTS

2013/0234868 A1     9/2013   Krasten
2014/0025294 A1*   1/2014   Boss et al. .................... 701/468

OTHER PUBLICATIONS

"IBM Drives Traffic Safety in UAE"—InternetNews. Apr. 15, 2005 http://www.internetnews.com/bus-news/article.php/3498101.

"Blow for Capita as IBM wins London congestion charge scheme." The Guardian. Oct. 25, 2007. http://www.guardian.co.uk/business/2007/oct/26/environment.congestioncharging.

"New York City's central area toll scheme too rushed, too complex—bidders, City may be listening."—Toll Roads News. Jan. 2, 2008. http://www.tollroadsnews.com/node/3325.

* cited by examiner

RECOVERY OF TIME DUE TO AN UNPLANNED EVENT ON A RESERVED ROUTE

BACKGROUND

The present invention relates to route optimization, and more specifically to route optimization through recovery of time due to an unplanned event on a reserved route.

The use of global positioning system (GPS) navigation systems in automobiles is becoming commonplace. Users are increasingly dependent on GPS devices to plan and direct their routes, real-time. Currently, traffic is random, as people drive to and from locations in a completely unpredictable manner.

When a large number of drivers are traveling to the same destination, or in the same area, traffic jams occur with little coordinated planning to prevent them. Also, given the chaotic and currently unpredictable nature of society and driving, the quantity of cars driving from random destinations, taking random routes, and arriving at random locations makes optimizing the system very difficult. At best, some events have a degree of predictability, for example, when a popular event is planned (e.g., sporting event or concert), local authorities may dispatch officers to help direct traffic, or they may post signs warning of the traffic congestion, but this would only affect roads in the immediate vicinity of the event.

Some individuals may be willing to pay for specific routes or "reserve" a specific route versus other GPS device users. The reserved routes may be more direct than other reserved routes or non-reserved routes to a destination.

SUMMARY

According to one embodiment of the present invention a method of providing reserved routes for a plurality of vehicles. The method comprising the steps of: a computer monitoring at least a location communicated from each of a plurality of vehicles having GPS devices and traveling to destinations on reserved routes with guaranteed arrival times; the computer monitoring real-time traffic data associated with a plurality of reserved routes; the computer receiving a traffic event along at least one of the reserved routes; the computer determining if any of the plurality of vehicles are affected or will be affected by the traffic event and calculating alternate routes for those vehicles which are affected or will be affected by the traffic event; the computer sending the alternate routes to the GPS devices in the vehicles which are affected or will be affected by the traffic event, and repeating the method from the step of monitoring at least a location until a vehicle has reached the destination for which the vehicle received a guaranteed arrival time; and once the vehicle has reached the destination, the computer comparing an actual arrival time of the vehicle at the destination to the guaranteed arrival time, and if the actual arrival time is later than the guaranteed arrival time, crediting a user of the vehicle for at least a portion of an amount paid for reserving the reserved route.

According to another embodiment of the present invention, a computer program product for providing reserved routes for a plurality of vehicles comprising a computer comprising at least one processor, one or more memories, one or more computer readable storage media, the computer program product comprising a computer readable storage medium having program instructions embodied therewith. The program instructions executable by the computer to perform a method comprising: monitoring, by the computer, at least a location communicated from each of a plurality of vehicles having GPS devices and traveling to destinations on reserved routes with guaranteed arrival times; monitoring, by the computer, real-time traffic data associated with a plurality of reserved routes; receiving, by the computer, a traffic event along at least one of the reserved routes; determining, by the computer, if any of the plurality of vehicles are affected or will be affected by the traffic event and calculating alternate routes for those vehicles which are affected or will be affected by the traffic event; and sending, by the computer, the alternate routes to the GPS devices in the vehicles which are affected or will be affected by the traffic event, and repeating the program instructions from the step of monitoring at least a location until a vehicle has reached the destination for which the vehicle received a guaranteed arrival time; and once the vehicle has reached the destination, comparing, by the computer, an actual arrival time of the vehicle at the destination to the guaranteed arrival time, and if the actual arrival time is later than the guaranteed arrival time, crediting a user of the vehicle for at least a portion of an amount paid for reserving the reserved route.

According to another embodiment of the present invention, a system for providing reserved routes for a plurality of vehicles comprising a computer comprising at least one processor, one or more memories, one or more computer readable storage media having program instructions executable by the computer to perform the program instructions. The program instructions comprising: monitoring, by the computer, at least a location communicated from each of a plurality of vehicles having GPS devices and traveling to destinations on reserved routes with guaranteed arrival times; monitoring, by the computer, real-time traffic data associated with a plurality of reserved routes; receiving, by the computer, a traffic event along at least one of the reserved routes; determining, by the computer, if any of the plurality of vehicles are affected or will be affected by the traffic event and calculating alternate routes for those vehicles which are affected or will be affected by the traffic event; and sending, by the computer, the alternate routes to the GPS devices in the vehicles which are affected or will be affected by the traffic event, and repeating the program instructions from the step of monitoring at least a location until a vehicle has reached the destination for which the vehicle received a guaranteed arrival time; and once the vehicle has reached the destination, comparing, by the computer, an actual arrival time of the vehicle at the destination to the guaranteed arrival time, and if the actual arrival time is later than the guaranteed arrival time, crediting a user of the vehicle for at least a portion of an amount paid for reserving the reserved route.

DETAILED DESCRIPTION

In an illustrated embodiment, it is recognized that guaranteeing an arrival time of a vehicle to a location may be achieved with dynamic route replanning to compensate for an unplanned event, such as a traffic event. The dynamic route replanning may include, but is not limited to waiving, refunding or reduction of fees on toll roads (if rerouted to a toll road), permission to drive in an express lane, carpool lane or other lane with restrictions that the vehicle would otherwise not meet, exceed the posted speed limit (with permission from the authorities), or recommending an alternate mode of transportation altogether.

In an illustrated embodiment, a reserved route is a route in which a vehicle may travel to a destination that is limited to a specific number of vehicles or type of vehicles.

In another illustrated embodiment, reserved routes to a destination may include an arrival time guarantee. If the arrival time is outside of the guaranteed arrival time, the user may be refunded or credited a percentage of the cost associated with purchasing the reserved route with the arrival time guarantee. The reserved routes with arrival time guarantees may be divided into tiers or levels, with different tiers having different costs and arrival time guarantees.

In another illustrated embodiment, it is recognized that an "unplanned event", for example a traffic event, is an occurrence that happens at a given place and time involving a vehicle, road network, or traffic device that may impede the time in which it will take a vehicle to travel from a first location to a second location, with the occurrence being present between the first location and the second location. A "reroute" is an alternative path for the vehicle to travel from the first location to the second location which avoids or circumvents the traffic event.

Figure 1:
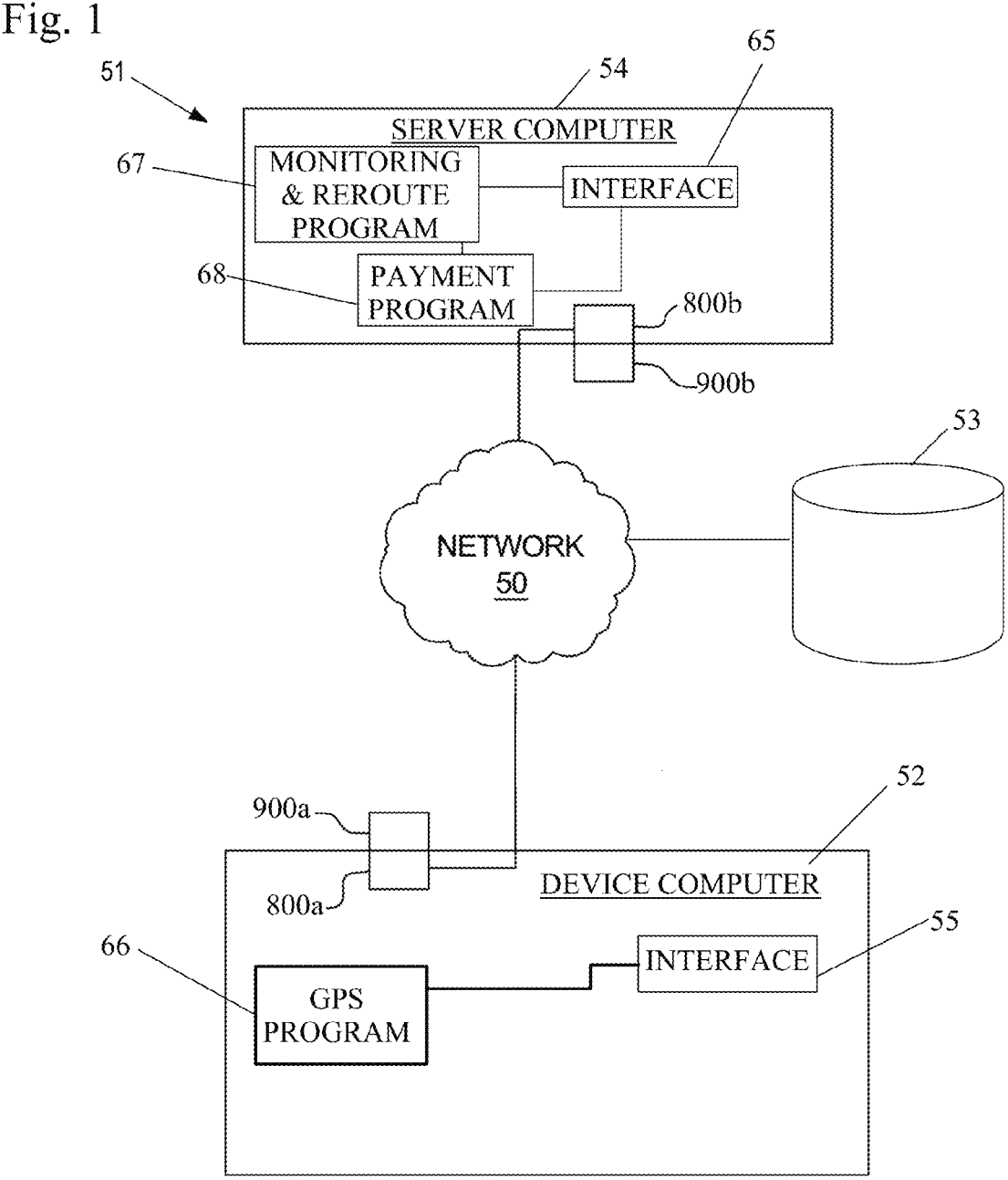
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. Also connected to a network may be a feed of real-time traffic information and monitoring services. In other exemplary embodiments, network data processing system 51 may include additional client or device computers, storage devices or repositories, server computers, and other devices not shown.

Figure 6:
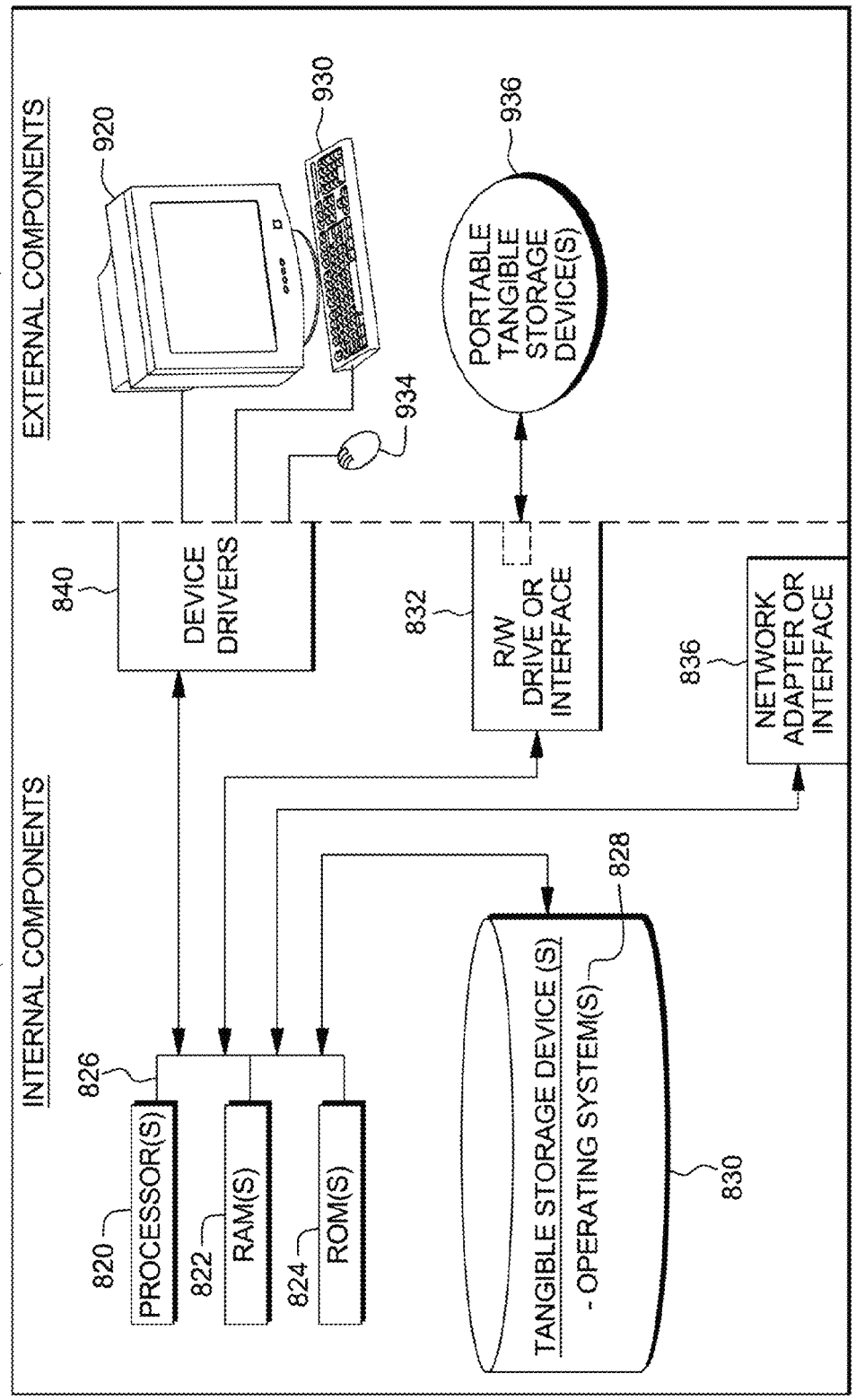
FIG. 6 illustrates internal and external components of a client or device computer and a server computer in which illustrative embodiments may be implemented.

Device computer 52 includes a set of internal components 800a and a set of external components 900a, further illustrated in FIG. 6. Device computer 52 may be, for example, a mobile device, a cell phone, a personal digital assistant, a netbook, a laptop computer, a tablet computer, a desktop computer, a global position system (GPS) device or any other type of computing device.

Device computer 52 may contain an interface 55. The interface 55 may accept commands and data entry from a user. The interface 55 can be, for example, a command line interface, a graphical user interface (GUI), or a web user interface (WUI) through which a user can input a payment method (which is processed by the server computer 54 through the payment program 68) or a location in which they wish to travel to and/or a reserved route, or alternatively on server computer 54. The device computer 52 preferably includes a GPS program 66. While not shown, it may be desirable to have the GPS program be present on the server computer 54.

Server computer 54 includes a set of internal components 800b and a set of external components 900b illustrated in FIG. 6. The server computer 54 may contain an interface 65. The interface 65 may accept commands and data entry. The interface 65 can be, for example, a command line interface, a graphical user interface (GUI), or a web user interface (WUI) which can accept and process payments from a user, for example through a payment program 68. The server computer 54 also preferably includes a monitoring and reroute program 67.

In the depicted example, server computer 54 provides information, such as boot files, operating system images, and applications to device computer 52. Server computer 54 can compute the information locally or extract the information from other computers on network 50.

Program code and programs such as a monitoring and reroute program 67, payment program 68, and/or a GPS program 66 may be stored on at least one of one or more computer-readable tangible storage devices 830 shown in FIG. 6, on at least one of one or more portable computer-readable tangible storage devices 936 as shown in FIG. 6, on repository 53 connected to network 50, or downloaded to a data processing system or other device for use. For example, program code and programs such as a monitoring and reroute program 67, payment program 68, and/or a GPS program 66 may be stored on at least one of one or more tangible storage devices 830 on server computer 54 and downloaded to the device computer 52. Alternatively, server computer 54 can be a web server, and the program code and programs such as a monitoring and reroute program 67, payment program 68, and/or GPS program 66 may be stored on at least one of the one or more tangible storage devices 830 on server computer 54 and accessed on the device computer 52. Monitoring and reroute program 67, payment program 68, and/or GPS program 66 can be accessed on device computer 52 through interface 55. In other exemplary embodiments, the program code and programs such as a monitoring and reroute program 67, payment program 68, and/or GPS program 66 may be stored on at least one of one or more computer-readable tangible storage devices 830 on server computer 54 or distributed between two or more servers.

Figure 4:
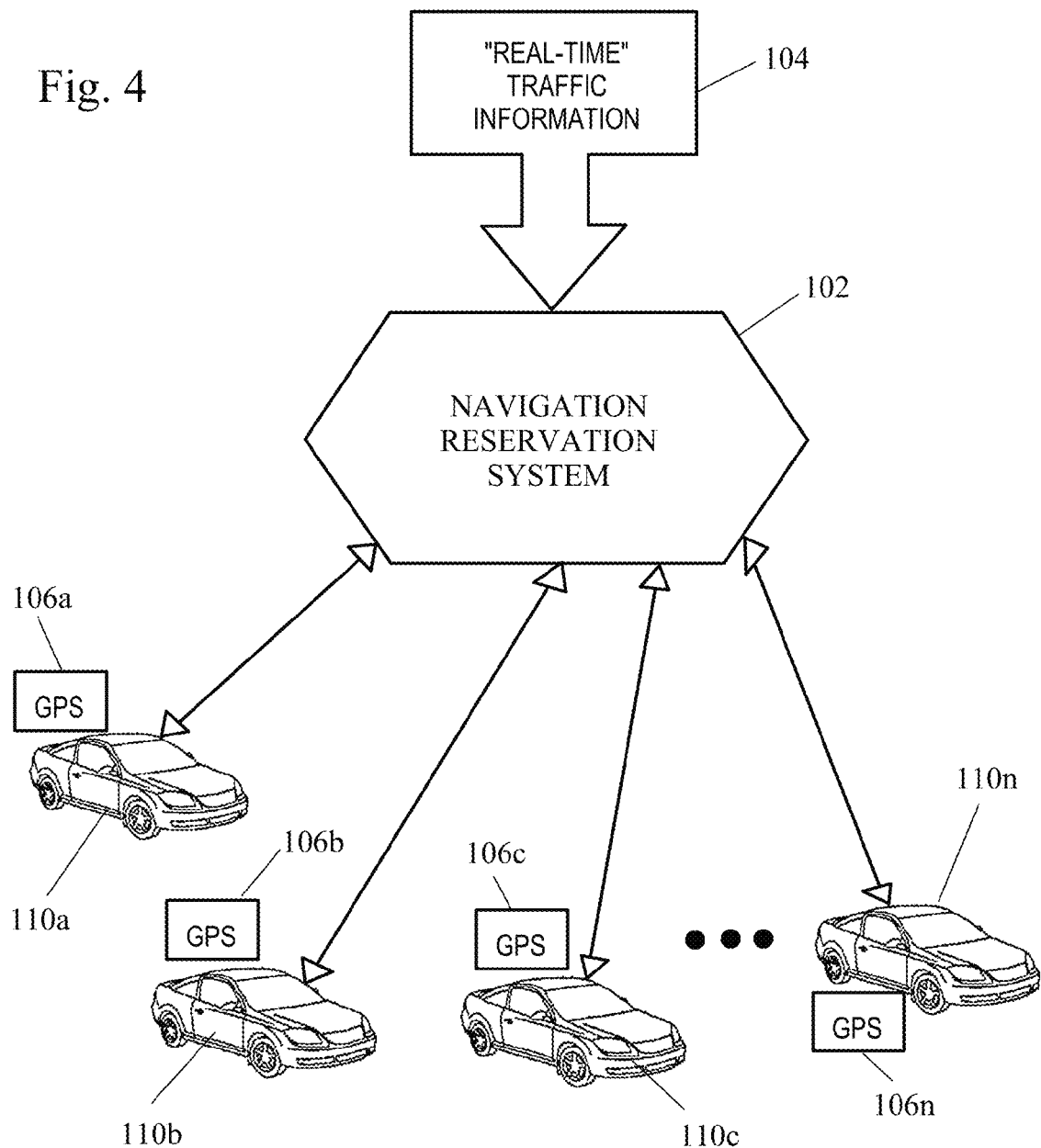
FIG. 4 shows a schematic of vehicles interacting with a navigation reservation system.

FIG. 4 shows a schematic of vehicles interacting with a navigation reservation system. A navigation reservation system 102 receives "real-time" traffic information. The navigation reservation system 102 bi-directionally communicates with vehicles 110a-110n with GPS devices 106a-106n.

In one embodiment, reserved routes are presented to the user in tiers for purchase. A first tier may, for example, provide a route for reservation that guarantees that the vehicle will arrive within N % of the time allocated for the trip. A second tier may, for example, provide a reserved route or route for reservation (either the same as the first tier or different) that guarantees that the vehicle will arrive within N+10% of the time allocated for the trip. A third tier may for example provide a reserved route (either the same as the first and second tier or different) that guarantees that the vehicle will arrive within N+20% of the time allocated for the trip. Additional tiers may be present and the time percentages varying. The arrival time with the smallest percentage of the time allocated for the arrival time guarantee would be the most expensive route to reserve. As the percentage of time allocated for the arrival time increases, the cost to the user to reserve the route may decrease. N may be any number greater than zero.

Figure 5:
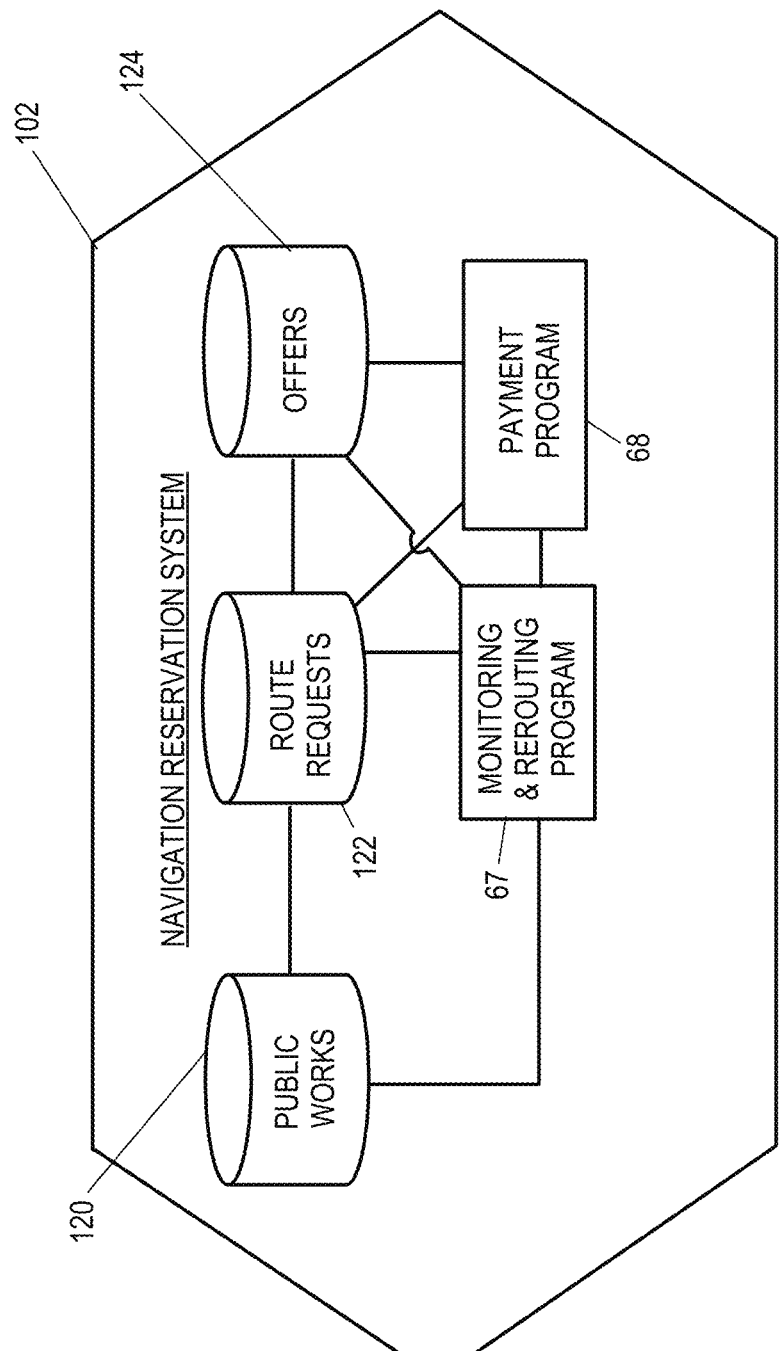
FIG. 5 shows a schematic of a navigation reservation system.

The navigation reservation system 102, shown in greater detail in FIG. 5, may include a public works repository 120, a route requests repository 122, a reserved route offers repository 124, a payment program 68, and a reroute and monitoring program 67.

The public works repository 120 may include information on availability of special permissions from transportation departments, for example to drive on specific roads, in specific lanes or at speeds greater than a posted speed limit, or arrangements to drive at reduced prices on toll roads. The route requests repository 122 includes requests for reserved routes, including routes that have been requested, but not paid for.

The offers repository 124 includes reserved routes that have been paid for by users. The reroute and monitoring program 67 is in communication with the public works repository 122, the route requests repository 122, the offers repository 124, and the payment program 68.

The payment program 68 is in communication with the offers repository 124, the reroute and monitoring program 67, and the route requests repository 122 and processes payments for the reserved routes with arrival time guarantees.

In FIG. 4, for example purposes only, one of the vehicles 110a with GPS device 106a has reserved a route in the first tier, with an arrival guarantee time that the vehicle will arrive within 2% of the time allocated for the trip and has paid $25. Vehicle 110b with GPS device 106b reserved a route in the second tier, with an arrival guarantee time that the vehicle will arrive within 12% of the time allocated for the trip and has paid $20. Vehicle 110b with GPS device 106b reserved a route in the third tier, with an arrival guarantee time that the vehicle will arrive within 22% of the time allocated for the trip and has paid $15.

The navigation reservation system 102 monitors the vehicles 110a-110c on their respective reserved routes and alters the reserved route to optimize the arrival time based on the paid reserved route so as to meet the guaranteed time. If the arrival time is not within the arrival time guaranteed, the navigation reservation system 102 may credit a portion of the amount paid for the reserved route back to the user.

Figure 2:
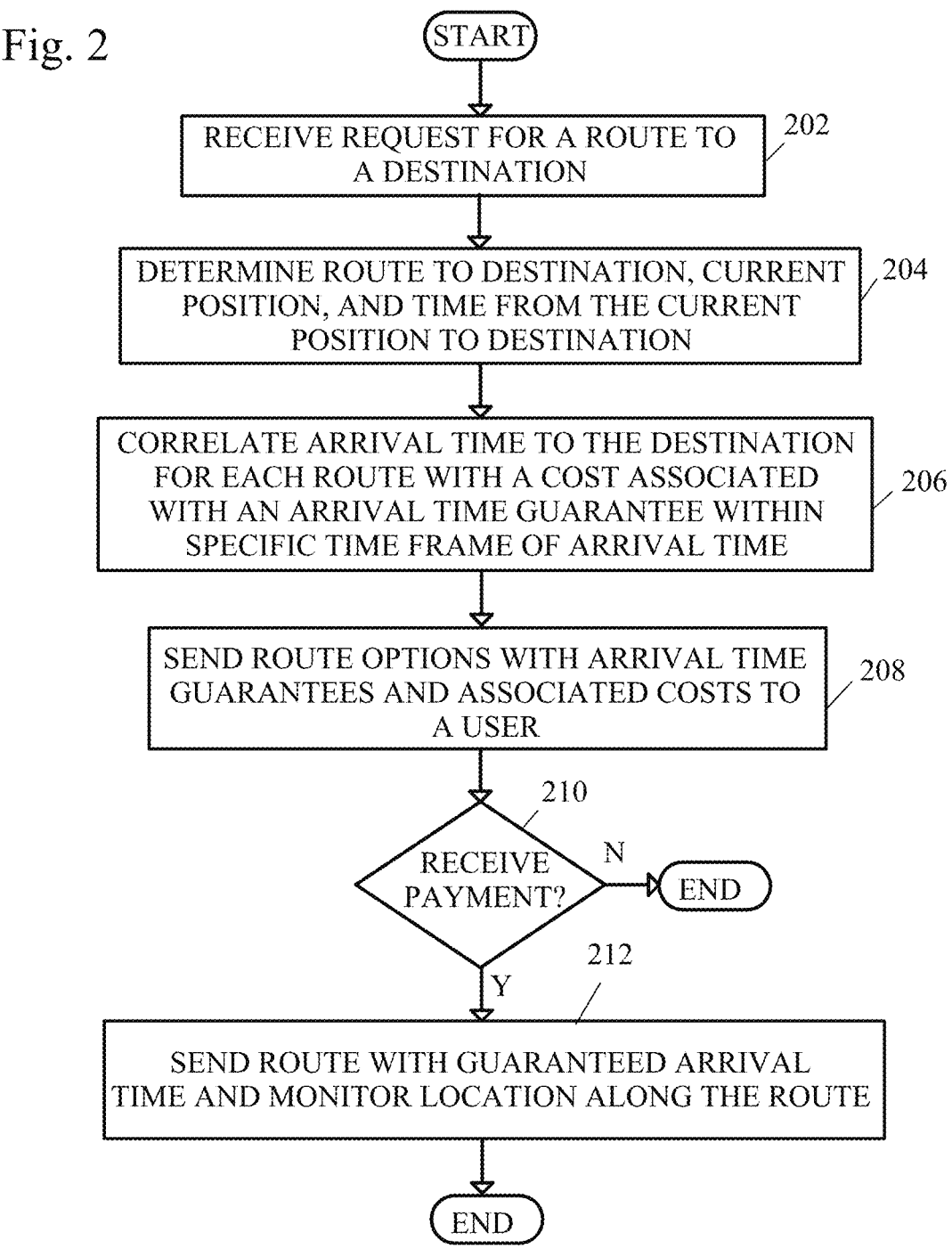
FIG. 2 shows a flow diagram of a method of reserving routes with arrival time guarantees.

FIG. 2 shows a flow diagram of a method of reserving routes and arrival time guarantees with the navigation reservation system.

In a first step, the navigation reservation system 102 receives a request from a GPS device of vehicle, for example through a GPS program 66, to reserve a route for the vehicle to travel to a destination (step 202), for example through the reroute and monitoring program 67.

The reroute and monitoring program 67 determines a route to the destination requested, current position of the vehicle requesting the route, and time from the current position to the destination based on a plurality of established routes (step 204).

The reroute and monitoring program 67 correlates the arrival time to the destination through the plurality of routes and associates a cost for reserving a route with an arrival time and guarantee of arriving within a specific time frame (step 206).

The reroute and monitoring program 67 sends route options to a GPS device for display to a user with arrival time guarantees and associated costs (step 208).

If a payment is not received (step 210), the method ends.

If a payment is received (step 210), the route is reserved and the route details are sent with the guaranteed arrival time to the GPS device for monitoring during route execution (step 212).

Figure 3:
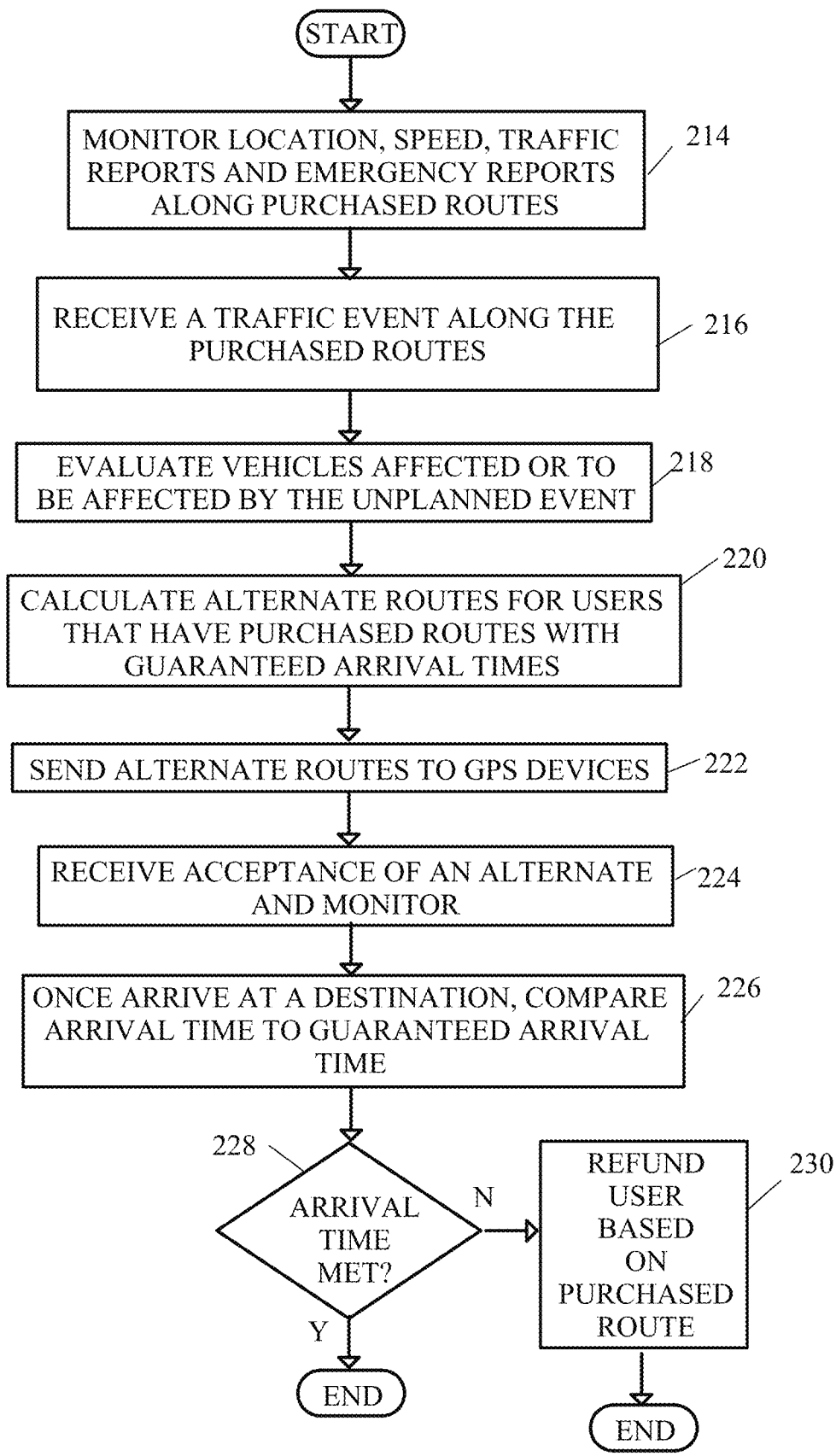
FIG. 3 shows a flow diagram of a method of monitoring vehicle progress along the reserved routes and aiding in the guaranteeing the arrival time of the vehicle to the destination within a specific amount of time.

Referring to FIG. 3, which shows a flow diagram of a method of monitoring vehicle progress along the reserved routes and aiding in the guaranteeing the arrival time of the vehicle to the destination within a specific amount of time.

The location, from the GPS device within the vehicle, speed, traffic report, for example through real time traffic information, and emergency reports along purchased routes or reserved routes with arrival time guarantees are monitored (step 214), for example through the reroute and monitoring program 67.

The reroute and monitoring program 67 receives a traffic event or an unplanned event along a purchased or reserved route (step 216).

The reroute and monitoring program 67 determines or evaluates what vehicles affected or to be affected by the unplanned event (step 218) and calculates alternative routes for users that to aid in having the users arrive within the specific time frame of the guaranteed arrival time (step 220).

It should be noted that the reroute and monitoring program 67 considers all the cars currently on the road or will be on the road within a specific amount of time to determine the most direct route for the users with reserved or purchased routes. The reroute and monitoring program 67 preferably gives priority to the users or vehicles that paid the most money and have the smaller window (lower percentage of time) in which the user can actually get to the destination and still meet the arrival time guarantee.

The reroute and monitoring program 67 sends alternate routes or reroutes to certain vehicles, for example including driving condition allowances, depending on the route purchased or reserved and continues to monitor the at least a location of the vehicle until the vehicle reaches its destination. For example, when the reserved or purchased routes are in tiers or service levels, a vehicle may be allowed to travel on a toll road at reduced fees or waved fees, receive permission to drive in an express lane, carpool lane or other lane with restrictions that the vehicle would otherwise not meet, or exceed the posted speed limit (with permission from the authorities). If the navigation reservation system 102 reroutes one of the vehicles, say car 110b, from a free route chosen by the user onto a toll route in order to meet the guarantee, the reservation system may reduce or rebate part of the guarantee fee to compensate for the toll charged by the road.

Alternatively, the user may be recommended to use an alternate mode of transportation altogether, such as bus, rail, or taxi.

The GPS device accepts the alternate route or reroute and/or driving condition allowances and proceeds on alternate route or with driving condition allowances to the destination (step 224).

Once the vehicle arrives at a destination, the payment program 68 compares the actual arrival time to the guaranteed arrival time (step 226), and if the arrival time is met (step 228), the method ends.

If the actual arrival time is not within the guaranteed arrival time (step 228), a refund or credit is used to the user for at least a portion of the amount paid for the reserved route and guaranteed arrival time (step 230) and the method ends.

FIG. 6 illustrates internal and external components of device computer 52 and server computer 54 in which illustrative embodiments may be implemented. In FIG. 6, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, monitoring and reroute program 67, payment program 68, and GPS program 66 are stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Monitoring and reroute program 67, payment program 68, and GPS program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Monitoring and reroute program 67, payment program 68, and GPS program 66 can be downloaded to the device computer 52 and server computer 54 from an external computer via a network (for example, the Internet, a local area network or other, wide area network) and network adapter or interface 836. From the network adapter or interface 836, monitoring and reroute program 67, payment program 68, and GPS program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Monitoring and reroute program 67, payment program 68, and GPS program 66 can be written in various programming languages including low-level, high-level, object-oriented or non object-oriented languages. Alternatively, the functions of a monitoring and reroute program 67, payment program 68, and GPS program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of providing reserved routes for a plurality of vehicles, comprising the steps of:
   a computer monitoring at least a location communicated from each of a plurality of vehicles having GPS devices and traveling to destinations on reserved routes with guaranteed arrival times;
   the computer monitoring real-time traffic data associated with a plurality of reserved routes;
   the computer receiving a traffic event along at least one of the reserved routes;
   the computer determining if any of the plurality of vehicles are affected or will be affected by the traffic event and calculating alternate routes for those vehicles which are affected or will be affected by the traffic event; and
   the computer sending the alternate routes to the GPS devices in the vehicles which are affected or will be affected by the traffic event, and repeating the method from the step of monitoring at least a location until a vehicle has reached the destination for which the vehicle received a guaranteed arrival time; and once the vehicle has reached the destination, the computer comparing an actual arrival time of the vehicle at the destination to the guaranteed arrival time, and if the actual arrival time is later than the guaranteed arrival time, crediting a user of the vehicle for at least a portion of an amount paid for reserving the reserved route.

2. The method of claim 1, wherein the computer additionally sends driving condition allowances to the GPS devices in the step of sending the alternate routes.

3. The method of claim 1, wherein prior to the step of the computer monitoring at least a location of a vehicle, the method comprises the steps of:
   the computer receiving a request from the GPS device of the vehicle to reserve a route for the vehicle to travel to a destination;
   the computer determining at least one route to the destination from the current position of the vehicle;
   the computer calculating an arrival time at the destination along the at least one route to the destination;
   the computer associating a cost for reserving the route with at least one arrival time guarantee;
   the computer sending the at least one route with the at least one arrival time guarantee and the cost associated with the at least one arrival time guarantee to the GPS device; and
   the computer receiving from the GPS device a choice of at least one reserved route with an arrival time guarantee.

4. The method of claim 3, wherein in the step of associating a cost, the computer associates a plurality of costs to a plurality of arrival time guarantees for the route, such that the computer sends a plurality of arrival time guarantees at differing costs to the GPS device for the user to select.

5. The method of claim 2, wherein the driving condition allowances include waiving toll road fees.

6. The method of claim 2, wherein the driving condition allowances include permission to drive in a lane or on a road that has restrictions that the vehicle would otherwise not meet.

7. The method of claim 2, wherein the driving condition allowances include exceeding posted speed limits for at least a portion of the alternate route.

8. A computer program product for providing reserved routes for a plurality of vehicles comprising a computer comprising at least one processor, one or more memories, one or more computer readable storage media, the computer program product comprising a computer readable non-transitory storage medium having program instructions embodied therewith, the program instructions executable by the computer to perform a method comprising:
   monitoring, by the computer, at least a location communicated from each of a plurality of vehicles having GPS devices and traveling to destinations on reserved routes with guaranteed arrival times;

monitoring, by the computer, real-time traffic data associated with a plurality of reserved routes;

receiving, by the computer, a traffic event along at least one of the reserved routes;

determining, by the computer, if any of the plurality of vehicles are affected or will be affected by the traffic event and calculating alternate routes for those vehicles which are affected or will be affected by the traffic event; and sending, by the computer, the alternate routes to the GPS devices in the vehicles which are affected or will be affected by the traffic event, and repeating the program instructions from the step of monitoring at least a location until a vehicle has reached the destination for which the vehicle received a guaranteed arrival time; and once the vehicle has reached the destination, comparing, by the computer, an actual arrival time of the vehicle at the destination to the guaranteed arrival time, and if the actual arrival time is later than the guaranteed arrival time, crediting a user of the vehicle for at least a portion of an amount paid for reserving the reserved route.

9. The computer program product of claim 8, wherein the computer additionally sends driving condition allowances to the GPS devices in the step of sending the alternate routes.

10. The computer program product of claim 8, wherein prior to monitoring at least a location of a vehicle, by the computer comprising:

receiving, by the computer, a request from the GPS device of the vehicle to reserve a route for the vehicle to travel to a destination;

determining, by the computer, at least one route to the destination from the current position of the vehicle;

calculating, by the computer, an arrival time at the destination along the at least one route to the destination;

associating, by the computer, a cost for reserving the route with at least one arrival time guarantee;

sending, by the computer, the at least one route with the at least one arrival time guarantee and the cost associated with the at least one arrival time guarantee to the GPS device; and receiving, by the computer, from the GPS device a choice of at least one reserved route with an arrival time guarantee.

11. The computer program product of claim 10, wherein associating, by the computer, a cost, associates a plurality of costs to a plurality of arrival time guarantees for the route, such that the computer sends a plurality of arrival time guarantees at differing costs to the GPS device for the user to select.

12. The computer program product of claim 9, wherein the driving condition allowances include waiving toll road fees.

13. The computer program product of claim 9, wherein the driving condition allowances include permission to drive in a lane or on a road that has restrictions that the vehicle would otherwise not meet.

14. The computer program product of claim 9, wherein the driving condition allowances include exceeding posted speed limits for at least a portion of the alternate route.

15. A computer system for providing reserved routes for a plurality of vehicles comprising a computer comprising at least one processor, one or more memories, one or more computer readable storage media having program instructions executable by the computer to perform the program instructions comprising:

monitoring, by the computer, at least a location communicated from each of a plurality of vehicles having GPS devices and traveling to destinations on reserved routes with guaranteed arrival times;

monitoring, by the computer, real-time traffic data associated with a plurality of reserved routes;

receiving, by the computer, a traffic event along at least one of the reserved routes;

determining, by the computer, if any of the plurality of vehicles are affected or will be affected by the traffic event and calculating alternate routes for those vehicles which are affected or will be affected by the traffic event; and sending, by the computer, the alternate routes to the GPS devices in the vehicles which are affected or will be affected by the traffic event, and repeating the program instructions from the step of monitoring at least a location until a vehicle has reached the destination for which the vehicle received a guaranteed arrival time; and once the vehicle has reached the destination, comparing, by the computer, an actual arrival time of the vehicle at the destination to the guaranteed arrival time, and if the actual arrival time is later than the guaranteed arrival time, crediting a user of the vehicle for at least a portion of an amount paid for reserving the reserved route.

16. The system of claim 15, wherein the computer additionally sends driving condition allowances to the GPS devices in the program instructions of sending the alternate routes.

17. The system of claim 15, wherein prior to the program instructions of monitoring at least a location of a vehicle, by the computer, the program instructions comprises:

receiving, by the computer, a request from the GPS device of the vehicle to reserve a route for the vehicle to travel to a destination;

determining, by the computer, at least one route to the destination from the current position of the vehicle;

calculating, by the computer, an arrival time at the destination along the at least one route to the destination;

associating, by the computer, a cost for reserving the route with at least one arrival time guarantee;

sending, by the computer, the at least one route with the at least one arrival time guarantee and the cost associated with the at least one arrival time guarantee to the GPS device; and receiving, by the computer, from the GPS device a choice of at least one reserved route with an arrival time guarantee.

18. The system of claim 17, wherein associating, by the computer, a cost, associates a plurality of costs to a plurality of arrival time guarantees for the route, such that the computer sends a plurality of arrival time guarantees at differing costs to the GPS device for the user to select.

19. The system of claim 16, wherein the driving condition allowances include waiving toll road fees.

20. The system of claim 16, wherein the driving condition allowances include permission to drive in a lane or on a road that has restrictions that the vehicle would otherwise not meet.

* * * * *